US012537327B2

(12) United States Patent
Ting et al.

(10) Patent No.: US 12,537,327 B2
(45) Date of Patent: Jan. 27, 2026

(54) CONDUCTIVE WIRE SET

(71) Applicant: ELKA INTERNATIONAL LTD., New Taipei (TW)

(72) Inventors: Yuan-Hsi Ting, New Taipei (TW); Kai-Hsuan Lin, New Taipei (TW); Ming-Chin Huang, New Taipei (TW)

(73) Assignee: ELKA INTERNATIONAL LTD., New Taipei (TW)

( * ) Notice: Subject to any disclaimer, the term of this patent is extended or adjusted under 35 U.S.C. 154(b) by 369 days.

(21) Appl. No.: 18/139,513

(22) Filed: Apr. 26, 2023

(65) Prior Publication Data

US 2024/0213699 A1 Jun. 27, 2024

(30) Foreign Application Priority Data

Dec. 23, 2022 (TW) ................................ 111214311

(51) Int. Cl.

| | |
|---|---|
| ***H01R 13/05*** | (2006.01) |
| ***H01R 11/11*** | (2006.01) |
| ***H01R 13/11*** | (2006.01) |
| ***H01R 13/629*** | (2006.01) |

(52) U.S. Cl.

CPC ........... *H01R 13/052* (2013.01); *H01R 11/11* (2013.01); *H01R 13/11* (2013.01); *H01R 13/629* (2013.01)

(58) Field of Classification Search

CPC ...... H01R 13/052; H01R 11/11; H01R 13/629
USPC ........................................................ 439/775
See application file for complete search history.

(56) References Cited

U.S. PATENT DOCUMENTS

| | | | | |
|---|---|---|---|---|
| 9,306,306 | B2 * | 4/2016 | Nishio | H01R 13/05 |
| 2008/0081519 | A1 * | 4/2008 | Fry | H01R 13/15 439/843 |
| 2011/0009009 | A1 * | 1/2011 | Lee | H01R 13/41 439/660 |

* cited by examiner

*Primary Examiner* — Tulsidas C Patel
*Assistant Examiner* — Thaslimur Rahman
(74) *Attorney, Agent, or Firm* — Birch, Stewart, Kolasch & Birch, LLP

(57) ABSTRACT

A conductive wire set includes a plurality of leads, a plurality of transfer terminals, and a conductive terminal. The plurality of leads are arranged with each other, and each of the leads extends along a first direction. Each of the leads has an outlet end. The plurality of transfer terminals each corresponds to one of the plurality of leads; each of the plurality of transfer terminals has a lead connection end and a plug end, and the lead connection end is connected to the outlet end of the corresponding lead. The conductive terminal includes a slot structure and a pin end. The slot structure has at least one slot for inserting the plug ends, and the pin end is opposite to the slot structure. The plug ends are inserted into at least one slot alongside and aligned with each other in a second direction other than the first direction.

18 Claims, 13 Drawing Sheets

CONDUCTIVE WIRE SET

FIELD

The present disclosure relates to a conductive wire set. Furthermore, the present disclosure relates to a conductive wire set connecting a plurality of leads.

BACKGROUND

Currently, the technology of connecting a plurality of leads to a single conductive terminal to form a parallel circuit is universally used. The plurality of leads connecting to the same conductive wire and receiving the same signal can be connected to different devices (e.g., control devices and interpretation computers).

However, when the plurality of leads are assembled into a single conductive terminal, the leads' ends are not aligned, and it is difficult to realize machinery automated manufacturing process for assembling the leads to the conductive terminal. As such, the current mainstream manufacturing method is manually assembling the plurality of leads to the single conductive terminal. However, in the manual manufacturing method, the control of the consistency of quality is difficult as well as time-consuming and laborious.

In addition, the assembled conductive terminal might be applied in vehicles or other machines which easily receive shocks. If the connection quality between the conductive terminal and the leads is not stable, the leads might be loosened due to the shock. Hence, the connection manner between the conductive terminal and the leads should be further improved.

SUMMARY

The present disclosure mainly intends to provide a conductive wire set (including a conductive terminal and leads) to enhance convenience of assembly.

The present disclosure further intends to provide a conductive wire set (including a conductive terminal and leads) to enhance the feasibility of machinery automatic connections of the leads.

In one aspect, the present disclosure provides a conductive wire set, which includes a plurality of leads, a plurality of transfer terminals, and a conductive terminal. The plurality of leads are arranged with each other and extend along a first direction, and each of the plurality of leads has an outlet end. The plurality of transfer terminals each corresponds to one of the plurality of leads, each of the plurality of transfer terminals has a lead connection end and a plug end opposite to each other, the lead connection end is connected to the outlet end of the corresponding lead. The conductive terminal includes a slot structure and a pin end. The slot structure has at least one slot for inserting the plug ends, and the pin end and the slot structure are opposite to each other. The plug ends are inserted into the at least one slot alongside and aligned with each other along a second direction other than the first direction.

In another aspect, the present disclosure provides a conductive wire set, which includes a plurality of leads, a plurality of transfer terminals, and a conductive terminal. The plurality of leads are arranged with each other and extend along a first direction, and each of the plurality of leads has an outlet end. The plurality of transfer terminals each corresponds to one of the plurality of leads, each of the plurality of transfer terminals has a lead connection end and a plug end opposite to each other, the lead connection end is connected to the outlet end of the corresponding lead. The conductive terminal includes a slot structure and a pin end. The slot structure has at least one slot for inserting the plug ends, and the pin end and the slot structure are opposite to each other. Each of the plug ends has an engaging portion engaged with at least one positioning portion in the slot structure.

Through the conductive wire set provided by the present disclosure, each of the leads can be positioned precisely, and machinery automatic connection with high accuracy is realized.

DETAILED DESCRIPTION

Figure 1:
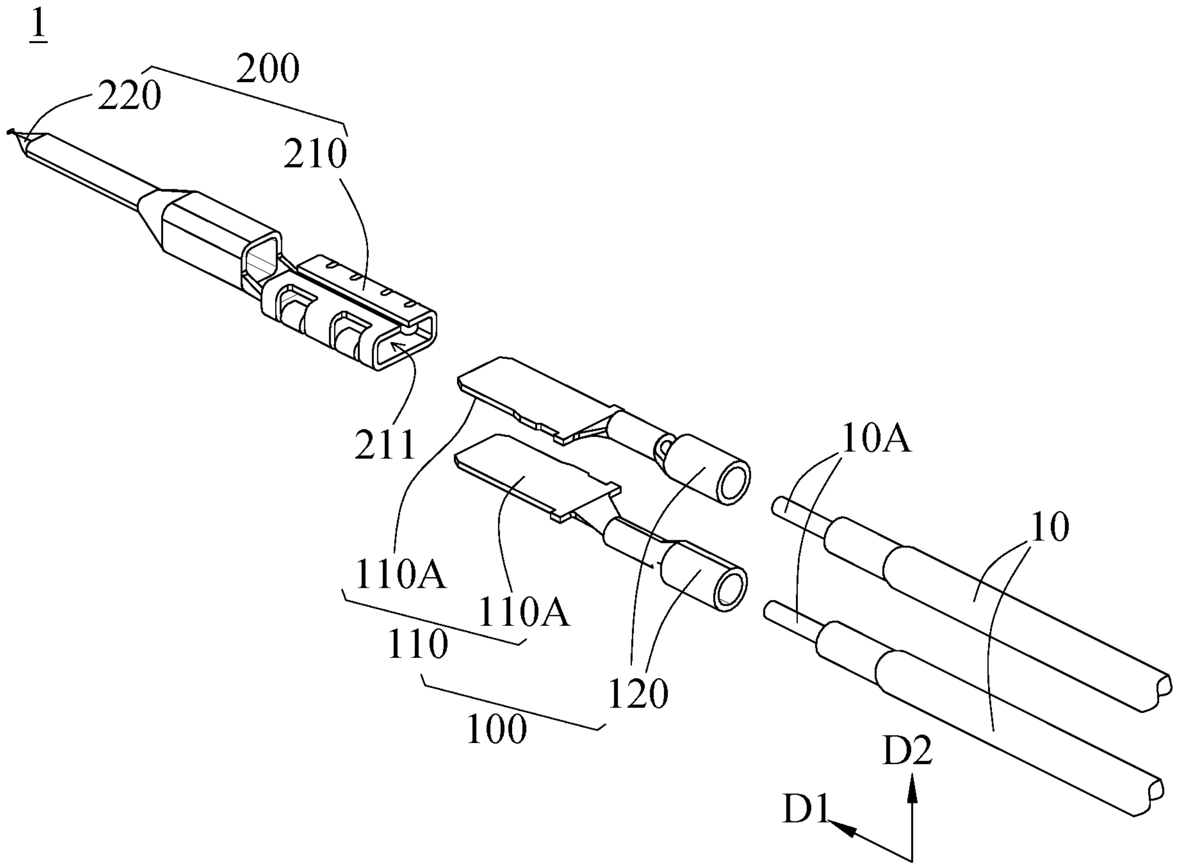
FIG. 1 is an exploded view of leads of a conductive wire set according to the first embodiment of the present disclosure arranged along a vertical direction and separated from each other.

Even though the terms such as "first", "second", and "third" may be used to describe an element, a part, a region, a layer, and/or a portion herein, these components are not limited by such terms. Such terms are used to differentiate an element, a part, a region, a layer, and/or a portion from another similar component.

The terms used herein merely intend to describe the specific embodiments, and do not limit the present disclosure. Unless the contents indicate, singular forms "a/an", "one", and "the" used herein include plural forms, including "at least one". The term "or" represents "and/or". The term "and/or" used herein includes all combinations of one or more related items. It should be understood that, when used herein, the term "including" represents the existence of the specified features, regions, entities, steps, operations, elements, and/or components, but does not exclude the existence or addition of one or more additional features, regions, entities, steps, operations, elements, components, and/or the combination thereof.

In addition, relative terms such as "lower" or "bottom" and "upper" or "top" may be used to describe the relationship between an element and another element herein, as shown in the drawings. It should be understood that the purpose of using relative terms is to include the different directions of the devices not shown in the drawings. For example, if a device in a figure is turned upside down, an element described as being "under" another element will be "on top of" that element. Therefore, the descriptive term "under" may include the meanings of both "under" and "on top of," depending on the orientation of the specific figure.

First Embodiment

Figure 2:
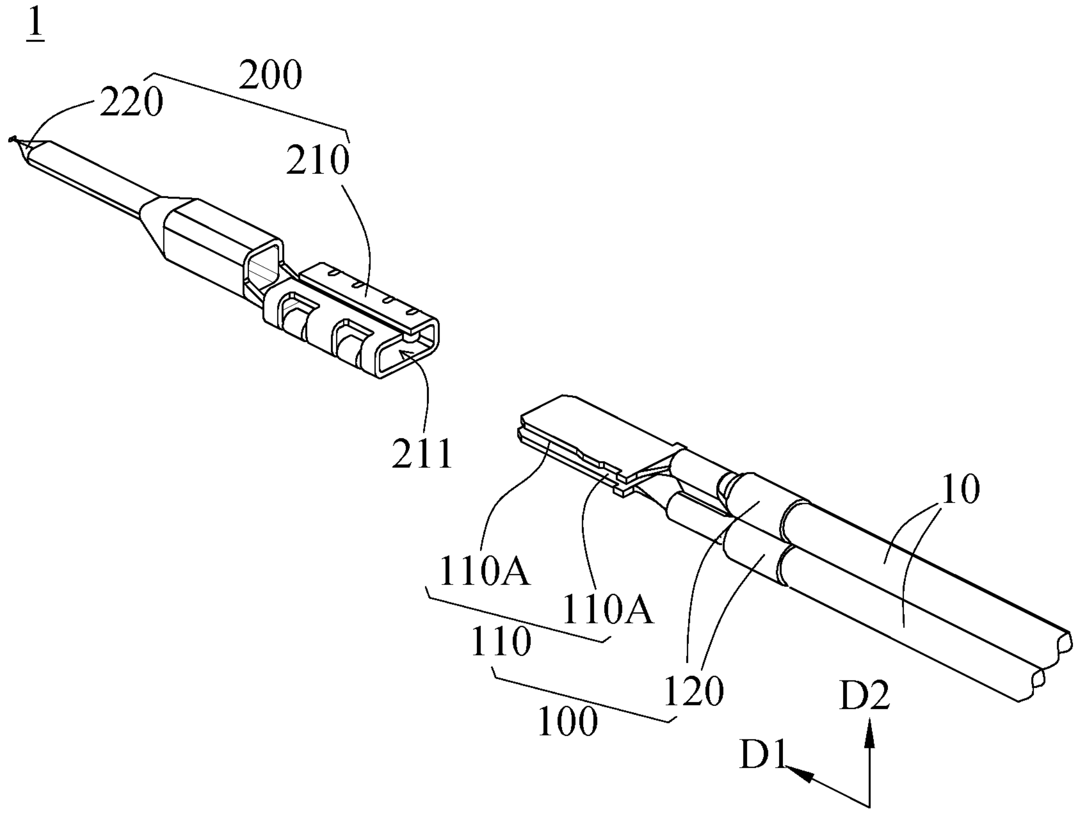
FIG. 2 is a three-dimensional schematic diagram illustrating the leads of the conductive wire set according to the first embodiment of the present disclosure arranged along the vertical direction and overlapped with each other.

Refer to FIG. 1 and FIG. 2, which are an exploded view and a three-dimensional schematic diagram of a conductive wire set 1 according to the first embodiment of the present disclosure, respectively. In the present embodiment, the conductive wire set 1 includes a plurality of leads 10, a plurality of transfer terminals 100, and a conductive terminal 200, wherein the leads 10 are arranged and extend along a first direction D1. Each of the lead 10 has an outlet end 10A. For convenience, an arrangement direction of the plurality of leads 10 is specified as a second direction D2, and in the embodiment illustrated in FIGS. 1 and 2, the second direction D2 is vertical, preferably perpendicular to, the first direction D1. For convenience, two leads 10 are illustrated in the present embodiment, for example. However, the number of the leads 10 of the present disclosure is not limited thereto. In other embodiments, the conductive wire set 1 may include three or more leads 10. The plurality of transfer terminals 100 respectively corresponds to the plurality of leads 10.

As illustrated in FIGS. 1 and 2, each of the transfer terminals 100 has a plug end 110 and a lead connection end 120 opposite to each other, and each lead connection end 120 is connected to the outlet end 10A of the corresponding lead 10. The outlet end 10A extends into the lead connection end 120, and then they are combined via methods such as wire bonding. Specifically, the outlet end 10A, for example, may be a bare wire after removing an insulating layer. The lead connection end 120 may be a slot formed by bending the body of the transfer terminal 100 after sheet metal stamping.

The conductive terminal 200 includes a slot structure 210 and a pin end 220. The slot structure 210 has at least one slot 211 for inserting the plug ends 110 therein, and the pin end 220 is opposite to the slot structure 210 along the first direction D1 and is configured to electrically connect the conductive terminal 200 to an external connector 300 (illustrated in FIG. 3). The plug ends 110 are inserted into the slot 211 alongside and aligned with each other. Specifically, each of the plug ends 110 may have a plug plane 110A, and when the plug ends 110 are inserted into slot 211, the plug planes 110A of the adjacent plug ends 110 are provided to be parallel and facing each other, so that the adjacent plug ends 110 are alongside and aligned with each other. As such, it is convenient to control the relative locations between the adjacent leads 10, and fully automated insertion is facilitated. However, the shape of the plug ends 110 is not limited thereto, and the plug ends 110 can be inserted into slot 211 alongside and aligned with each other via other means.

In the embodiment illustrated in FIG. 1 and FIG. 2, the arrangement direction (the second direction D2) of the leads 10, for example, may be vertical direction (that is, the plurality of leads 10 are stacked up). However, it is illustrated schematically the arrangement direction of the leads 10 may also be horizontal, and can be changed correspondingly due to the movement of the position of the conductive wire set 1 in the process of using. The present disclosure is not limited thereto.

Figure 3:
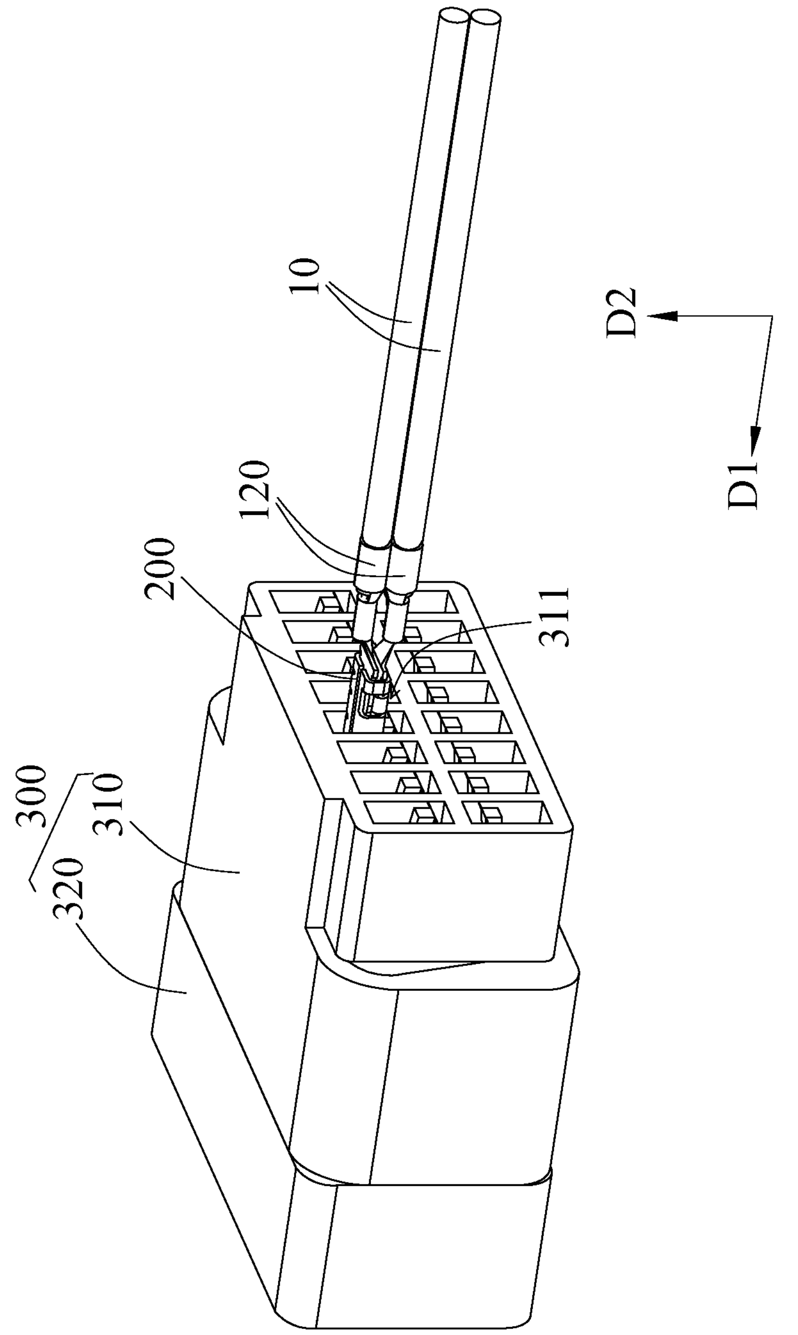
FIG. 3 is a three-dimensional schematic diagram illustrating a conductive terminal of the conductive wire set according to the first embodiment of the present disclosure electrically connecting to an external connector.

As illustrated in FIG. 3, the assembled conductive wire set 1 can be inserted into the external connector 300 via the pin end 220 of the conductive terminal 200. The external connector 300, for example, may include a first housing 310 and a second housing 320 arranged with each other along the first direction D1. Wherein the first housing 310 is closer to the conductive wire set 1 compared with the second housing 320, and the first housing 310 may have a plurality of connector slots 311 configured to insert the pin end 220 therein. However, the structure of the external connector 300 is merely illustrated schematically, and the configuration thereof is not limited thereto.

Figure 4:
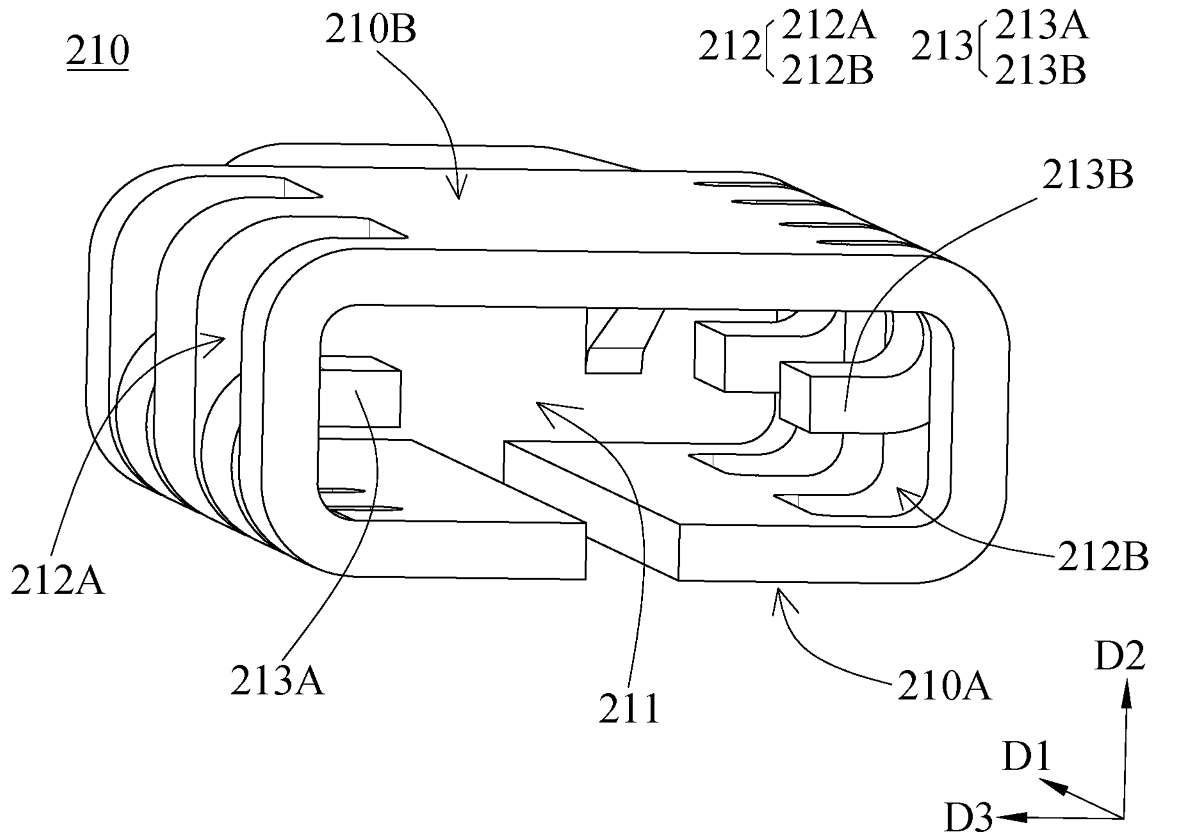
FIG. 4 is a three-dimensional schematic diagram illustrating a slot structure of the conductive wire set according to the first embodiment of the present disclosure.

FIG. 4 is a three-dimensional schematic diagram illustrating the slot structure 210 of the conductive terminal 200 according to the first embodiment of the present disclosure. As illustrated in FIG. 4, slot 211 of slot structure 210 has at least one isolation structure 213 at least partially extending along a third direction D3 which is different from both the first direction D1 and the second direction D2 (e.g., the third direction D3 may be perpendicular to both the first direction D1 and the second direction D2), and different accommodation regions within the slot 211 are formed on opposite sides along the second direction D2 with the isolation structure 213 therebetween to accommodate each of the plug ends 110. As such, it is possible to prevent the adjacent plug ends 110 from sliding with each other within slot structure 210 to cause poor electronic signal transmission. In addition, when one plug end 110 is inserted into slot 211, the isolation structure 213 provides a function of guiding division so as to prevent plug end 110 from extending into the accommodation region of another plug end 110. In addition, the different leads 10 can be used alone without interfering with each other.

Figure 5:
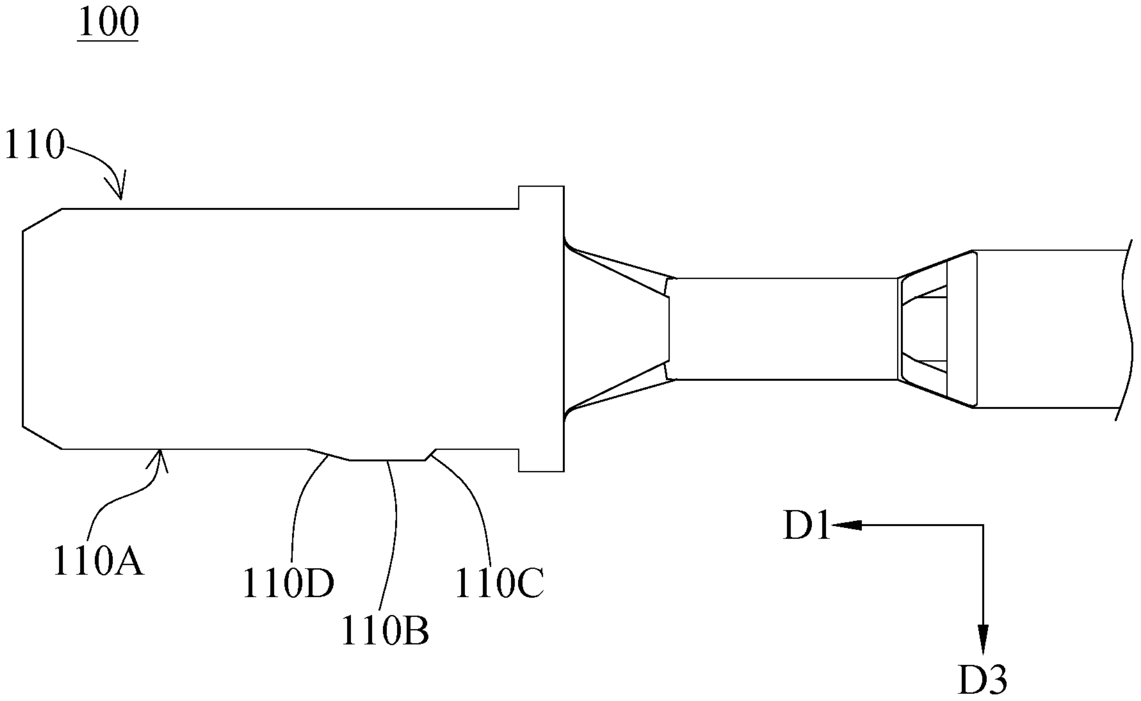
FIG. 5 is a three-dimensional schematic diagram illustrating a transfer terminal of the conductive wire set according to the first embodiment of the present disclosure.
Figure 6:
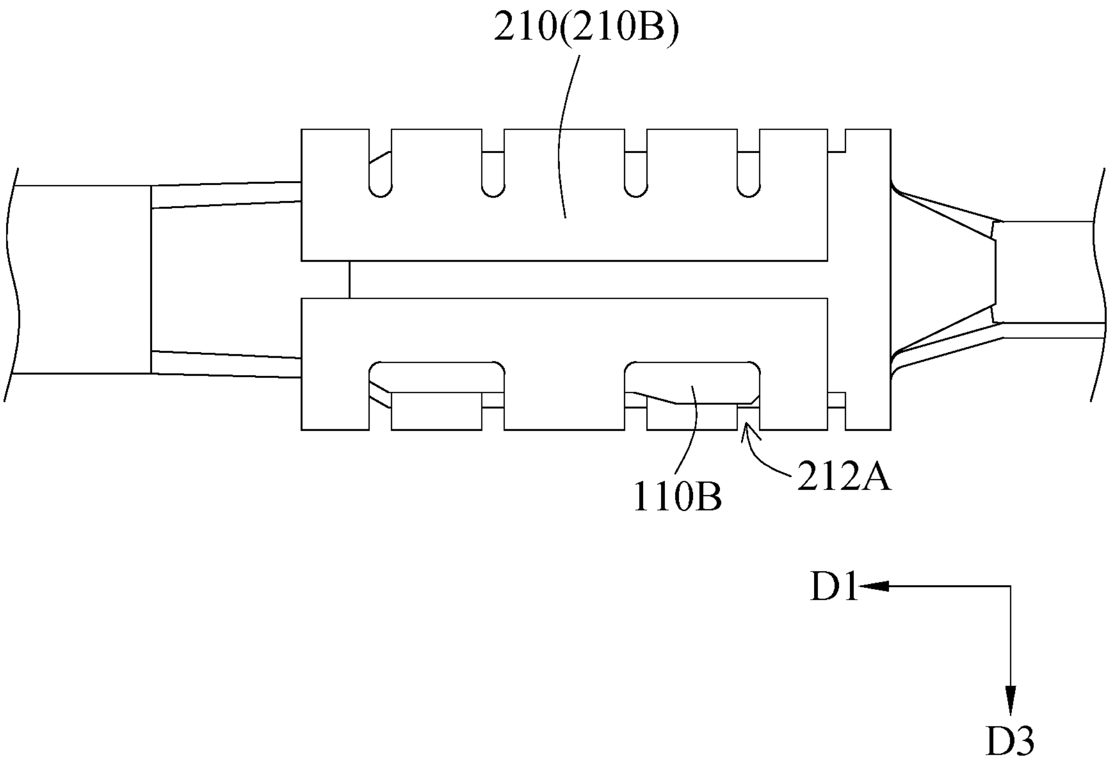
FIG. 6 is a top view of a plug end inserted into the slot structure of the conductive wire set according to the first embodiment of the present disclosure.
Figure 7:
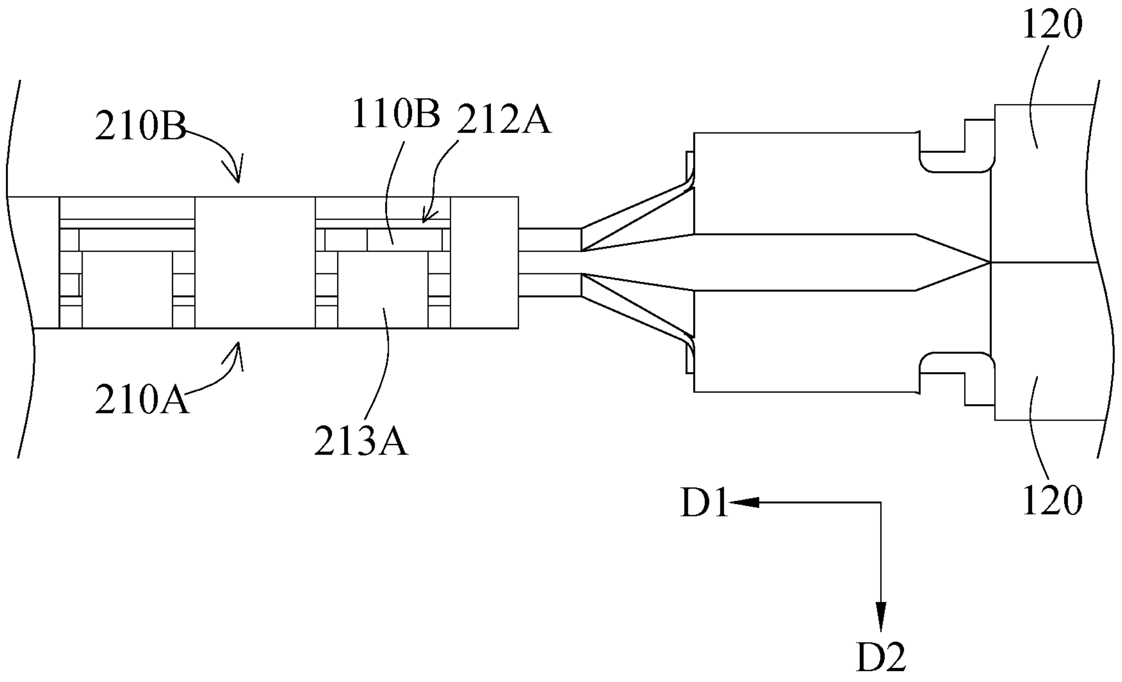
FIG. 7 is a side view of the plug end(s) inserted into the slot structure of the conductive wire set according to the first embodiment of the present disclosure.

FIG. 5 is a three-dimensional schematic diagram illustrating the plug end 110 of the transfer terminal 100 according to the first embodiment of the present disclosure and FIG. 6 and FIG. 7 are a top view and a side view of the plug end 110 inserted into the slot structure 210 in the conductive wire set 1 according to the first embodiment of the present disclosure, respectively. As illustrated in FIG. 5, the plug end 110 has an engaging portion 110B protruding from a side surface of the plug end 110 toward the third direction D3, and as illustrated in FIG. 6 and FIG. 7, the engaging portion 110B is engaged with at least one positioning portion 212 in the slot structure 210.

In the present embodiment, the engaging portion 110B has a first inclined plane 110C and a second inclined plane 110D, respectively, located at a proximal end and a distal end opposite to the lead connection end 120 along the first direction D1. The first inclined plane, 110C, and the second inclined plane, 110D, have different inclination degrees. When the engaging portion 110B has inclined planes with different inclination degrees, respectively, at the proximal and distal ends, the force level required for inserting and that required for removing are different. As such, the plug end 110 does not easily fall off the structure (i.e., leaving the positioning portion 212) due to external forces. Specifically, in the present embodiment, when an end surface of the plug end 110 is a reference surface, the inclination degree of the first inclined plane 110C is preferably larger than that of the second inclined plane 110D to ensure that the force level required for removing is larger than that required for inserting. As such, it is further possible to prevent the plug end 110 from accidentally falling off the structure when it is subject to external forces.

In the present embodiment, the slot structure 210 is configured to insert the two plug ends 110 therein, for example. Referring again to FIG. 4, in the present embodiment, the slot structure 210 has a first side wall 210A and a second side wall 210B opposite to each other along the second direction D2. The isolation structure 213 includes one or more first isolation structure 213A, which extends from the first side wall 210A and is folded to extend along the third direction D3 (i.e., a direction parallel to the first side wall 210A) into slot 211. The isolation structure 213 further includes one or more second isolation structure 213B, which extends from the second side wall 210B and is folded to extend along the third direction D3 into slot 211. In the present embodiment, the first isolation structure 213A can face a corresponding second isolation structure 213B in slot structure 210. Specifically, the first side wall 210A and the second side wall 210B may be formed by bending the same metal plate, and the metal plate can be cut to form strip-shaped cantilever(s) connecting to the first side wall 210A and/or the second side wall 210B, and the first isolation structure 213A and/or the second isolation structure 213B are formed by bending the cantilever(s) again.

In the present embodiment, accommodation regions within slot 211 are formed on opposite sides along the second direction D2 with the first isolation structure 213A and the second isolation structure 213B. As such, they are configured to insert the different plug ends 110 therein so that the adjacent plug ends 110 are respectively positioned on opposite sides with the isolation structure 213 (the first isolation structure 213A and the second isolation structure 213B) therebetween. By providing the first isolation structure 213A and the second isolation structure 213B facing each other between the accommodation regions, the adjacent plug ends 110 connected with each other can be prevented from sliding in slot structure 210 to displace and cause the phenomenon of poor electric signal transmission.

In the present embodiment, the accommodation regions preferably correspond to the positioning portion 212. For example, the first isolation structure 213A has a first positioning portion 212A located on one side (e.g., an upper side) along the second direction D2, and the second isolation structure 213B has a second positioning portion 212B located on another side (e.g., a lower side) along the second direction D2. As such, the first positioning portion 212A and the second positioning portion 212B are located on different sides of slot structure 210 along the third direction D3. In other words, the first positioning portion 212A and the second isolation structure 213B corresponding to the two adjacent accommodation regions isolated from each other by the isolation structure 213 therebetween are respectively located on opposite sides of the slot structure 210 along the third direction D3. In the present embodiment, positioning portion 212 is a notch or a dent formed by cutting the metal plate for accommodating and interfering with positioning portion 212. In addition, as mentioned above, in the present embodiment, the metal plate is cut to form cantilevers, and the isolation structure 213 is formed by bending it, and the remaining notch after bending will become the positioning portion 212.

In the present embodiment, the engaging portions 110B of the adjacent two plug ends 110 arranged with each other extend toward opposite sides of the slot structure 210 along the third direction D3 so that the engaging portion 110B of each of the plug ends 110 can respectively match the corresponding first positioning portion 212A or the corresponding second positioning portion 212B.

In addition, the slot structure 210 in the present embodiment may have a plurality of first isolation structures 213A and a plurality of second isolation structures 213B in parallel with each other along the first direction D1. And the plug end 110 may also have a plurality of engaging portions 110B in accordance with the number of the first isolation structures 213A or the second isolation structures 213B. In addition, the number of plug ends 110, which can be inserted into the slot structure 210 of the present disclosure, is not limited to two, the slot structure 210 can be varied to be configured to insert equally to or more than three plug ends 110. In addition, when the first isolation structures 213A or the second isolation structures 213B are plural, they can be connected to strip structures of the first side wall 210A and the second side wall 210B to further spaced apart from each other, to enhance the structural stability of the body of the slot structure 210.

Second Embodiment

Figure 8:
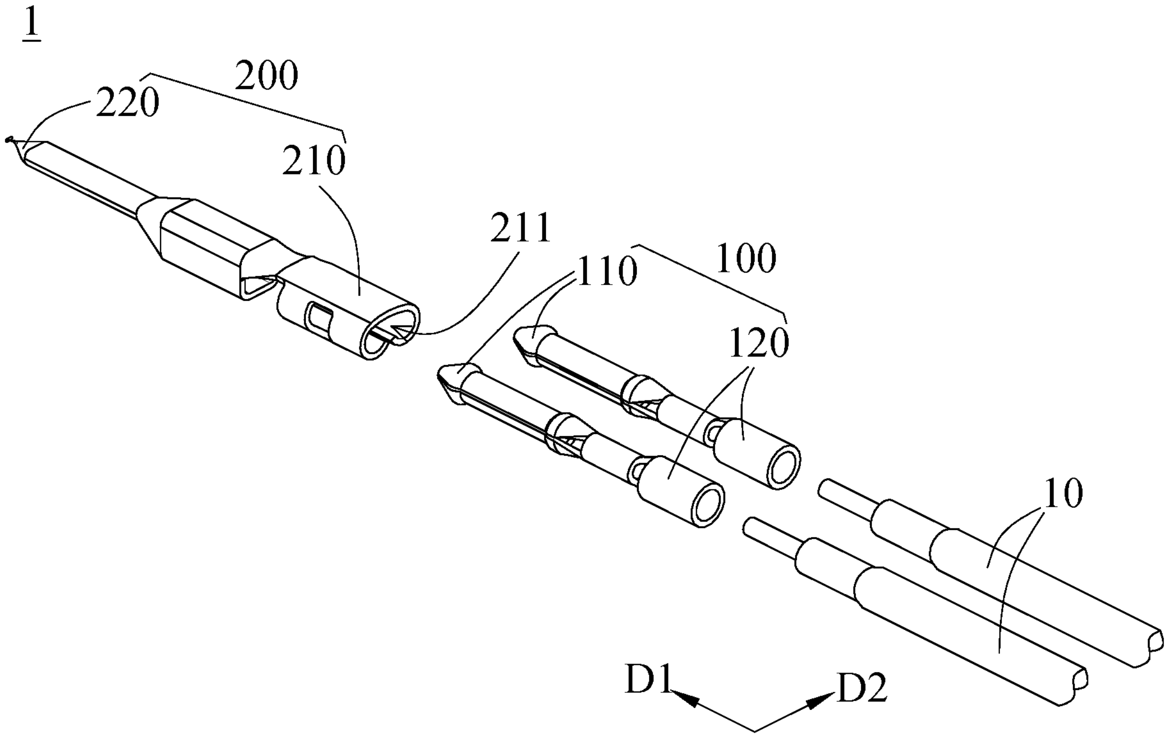
FIG. 8 is an exploded view of leads of a conductive wire set according to the second embodiment of the present disclosure arranged in a horizonal direction.
Figure 9:
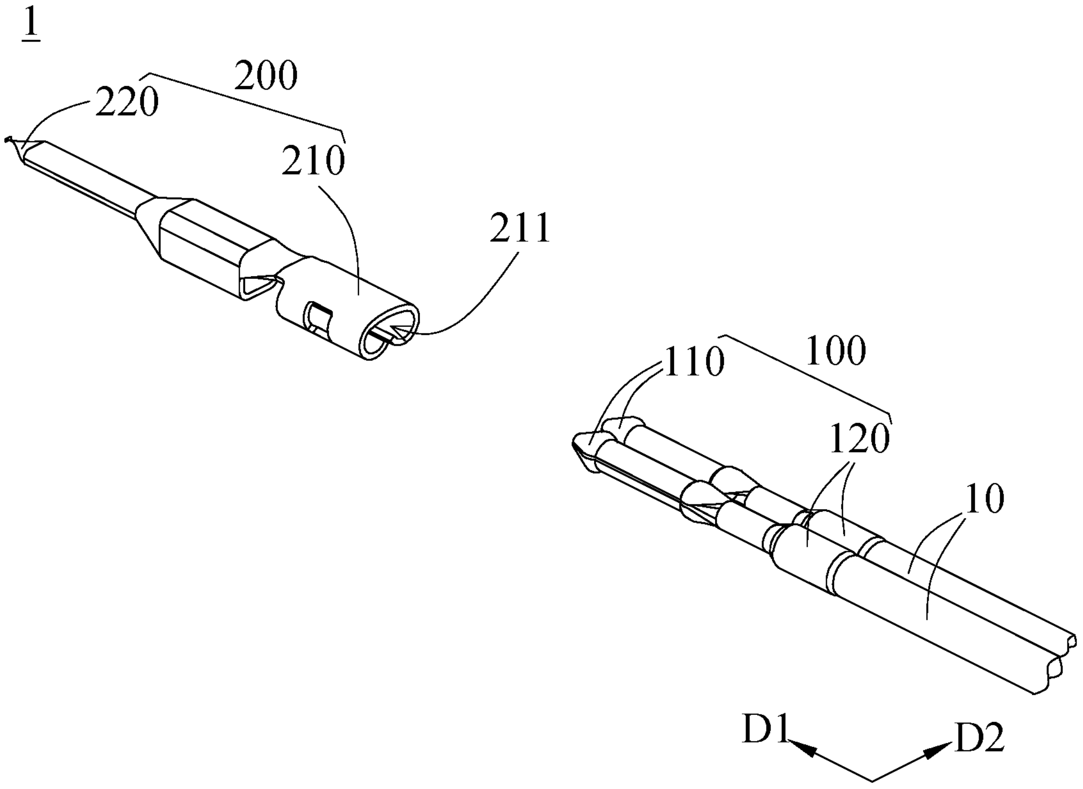
FIG. 9 is a three-dimensional schematic diagram illustrating the leads of the conductive wire set according to the second embodiment of the present disclosure arranged in the horizonal direction.

Refer to FIG. 8 and FIG. 9, which illustrate an exploded view and a three-dimensional schematic diagram of the leads 10 of the conductive wire set 1 according to the second embodiment of the present disclosure arranged in a horizontal direction. Analogous to the first embodiment, to give a convenient explanation, an extending direction of the leads 10 is defined to be the first direction, D1, and an arrangement direction thereof is defined to be the second direction D2. In the embodiment illustrated in FIG. 8 and FIG. 9, the second direction, D2, is a horizontal direction. However, it is used schematically, and the arrangement direction of the leads 10 may also be a vertical direction and can be changed correspondingly due to the movement of the position of the conductive wire set 1 in the process of use. The present disclosure is not limited thereto.

Figure 10:
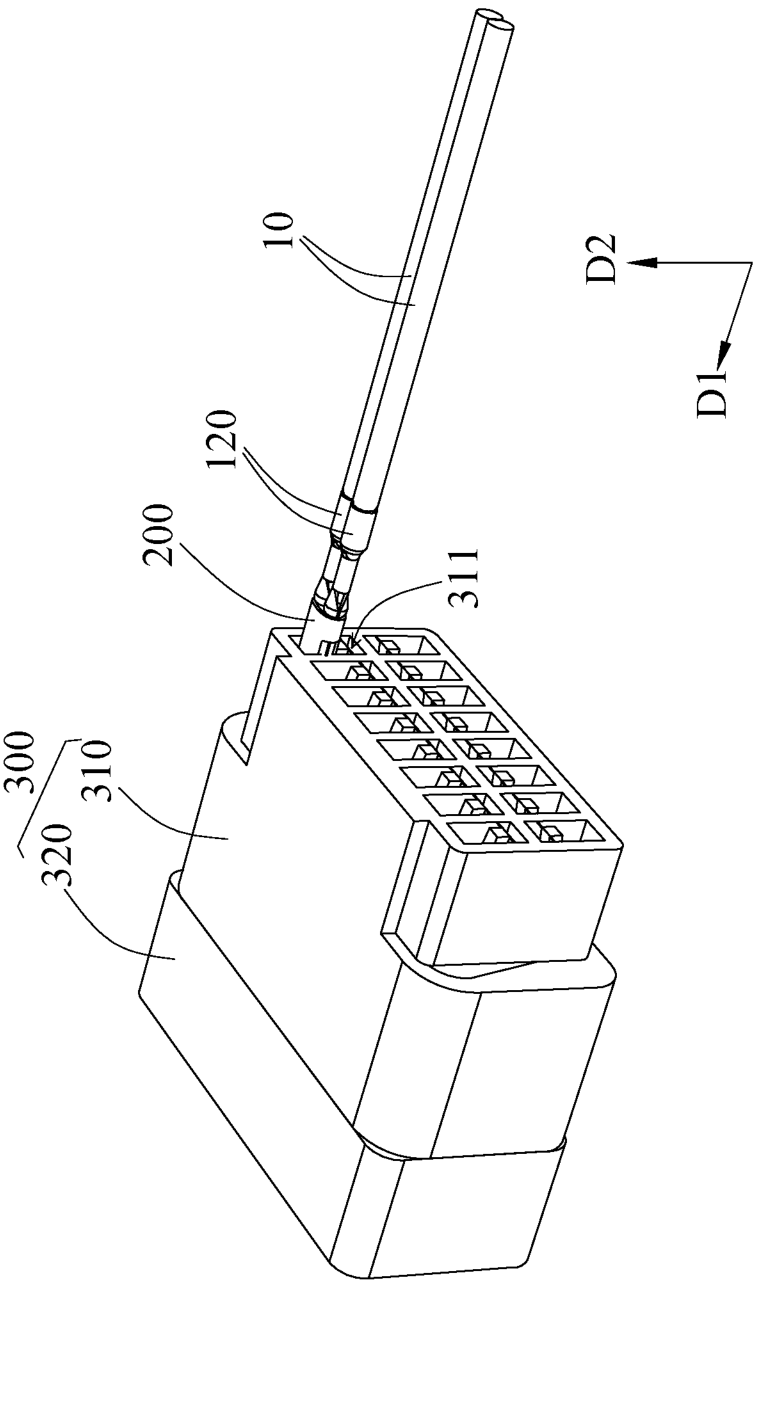
FIG. 10 is a three-dimensional schematic diagram illustrating a conductive terminal of the conductive wire set according to the second embodiment of the present disclosure electrically connected to an external connector.

FIG. 10 is a three-dimensional schematic diagram illustrating the conductive terminal 200 in the conductive wire set 1 according to the second embodiment of the present disclosure electrically connected to the external connector 300. Analogous to the external connector 300 illustrated in FIG. 3, the external connector 300 may have the first housing 310 and the second housing 320, and the first housing 310 has a plurality of connector slots 311 configured to insert the pin end 220 therein. In the case of the pin end 220 having the same structure and the same size, the conductive wire sets 1 according to different embodiments (e.g., the first embodiment and the second embodiment) can be inserted into the other connector slots 311 of the same external connector 300 at the same time. The second embodiment is mainly different from the first embodiment in the designs of the transfer terminal 100 and the slot structure 210. Hereafter, these differences will be described in detail.

Figure 11:
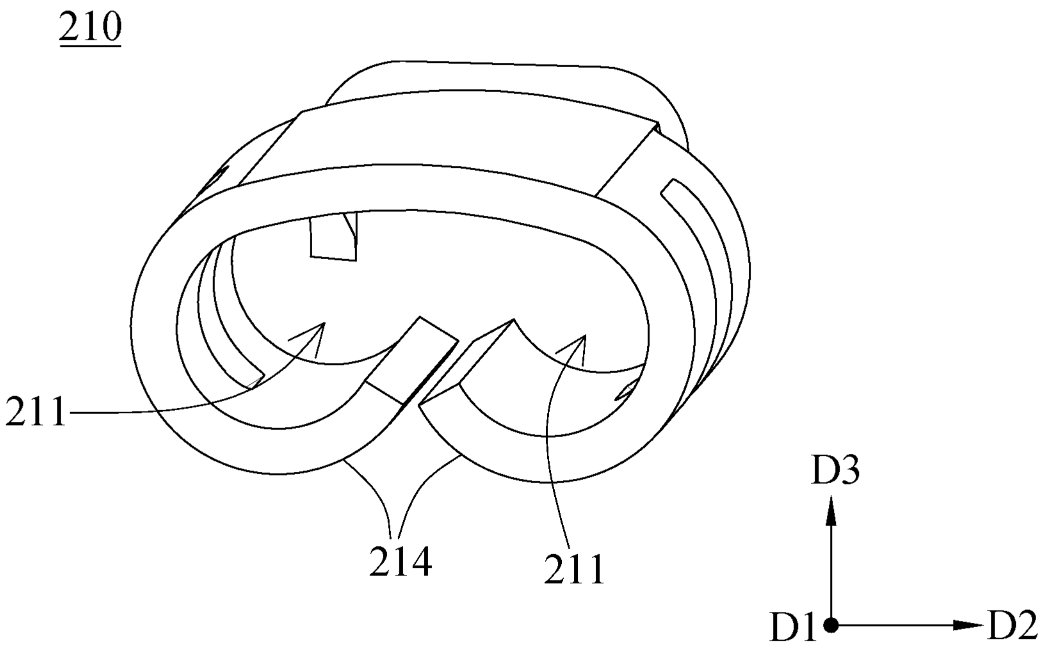
FIG. 11 is a three-dimensional schematic diagram illustrating a slot structure of the conductive wire set according to the second embodiment of the present disclosure.

FIG. 11 is a three-dimensional schematic diagram illustrating the slot structure 210 in the conductive terminal 200 according to the second embodiment of the present disclosure. Hereafter, the embodiment of the two leads 10 arranged in a horizontal direction will be described, for example. As illustrated in FIG. 11, the slot structure 210 has a plurality of tubular/semi-tubular shaped structures 214 arranged along the second direction D2 on at least one side along a third direction D3 (e.g., a direction perpendicular to both the first direction D1 and the second direction D2), so that a plurality of accommodation regions are formed corresponding to the plurality of tubular/semi-tubular shaped structures 214 in the slot 211 formed surrounded by the slot structure 210. Each accommodation region is configured to insert corresponding one of the plurality of plug ends 110 therein, and the side cross-sectional shapes of the tubular/semi-tubular structures 214 are not limited to the shape as illustrated in FIG. 11, the side cross-section of the tubular/semi-tubular shaped structures 214 may have any polygonal shapes such as shapes of rectangle, triangle, or square. In addition, in the second embodiment, slot structure 210 may have tubular/semi-tubular shaped structures at opposite two sides along the second direction D2; however, the present disclosure is not limited thereto. Specifically, the slot structure 210 can be formed by bending the metal plate, and the two ends of the metal plate can be curved toward the same direction by larger than 180 degrees to form the two accommodation regions similar to tubes alongside each other to be the slot 211.

Figure 12:
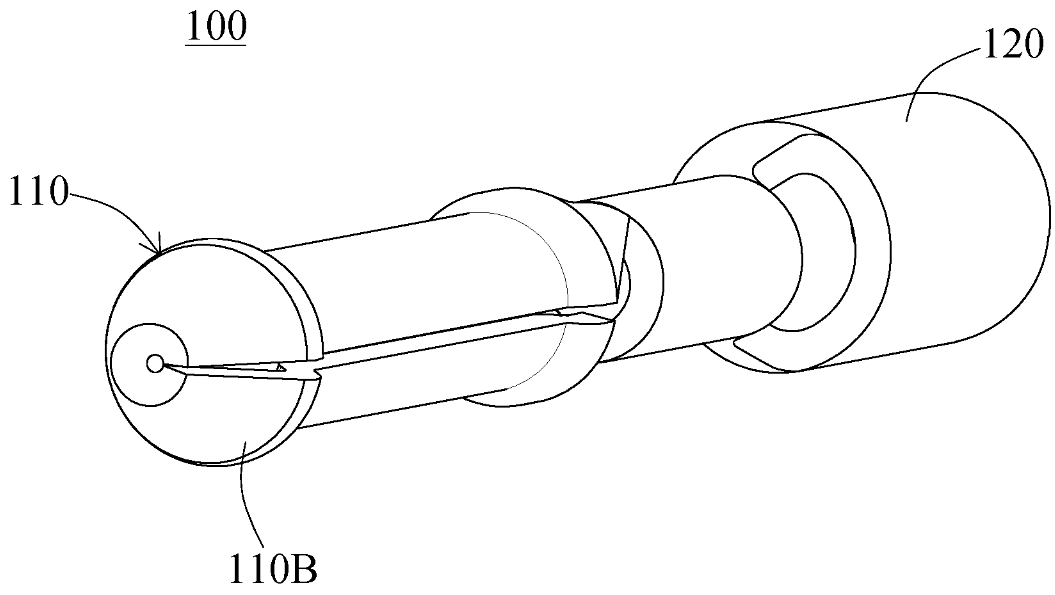
FIG. 12 is a three-dimensional schematic diagram illustrating a transfer terminal of the leads of the conductive wire set according to the second embodiment of the present disclosure.
Figure 13:
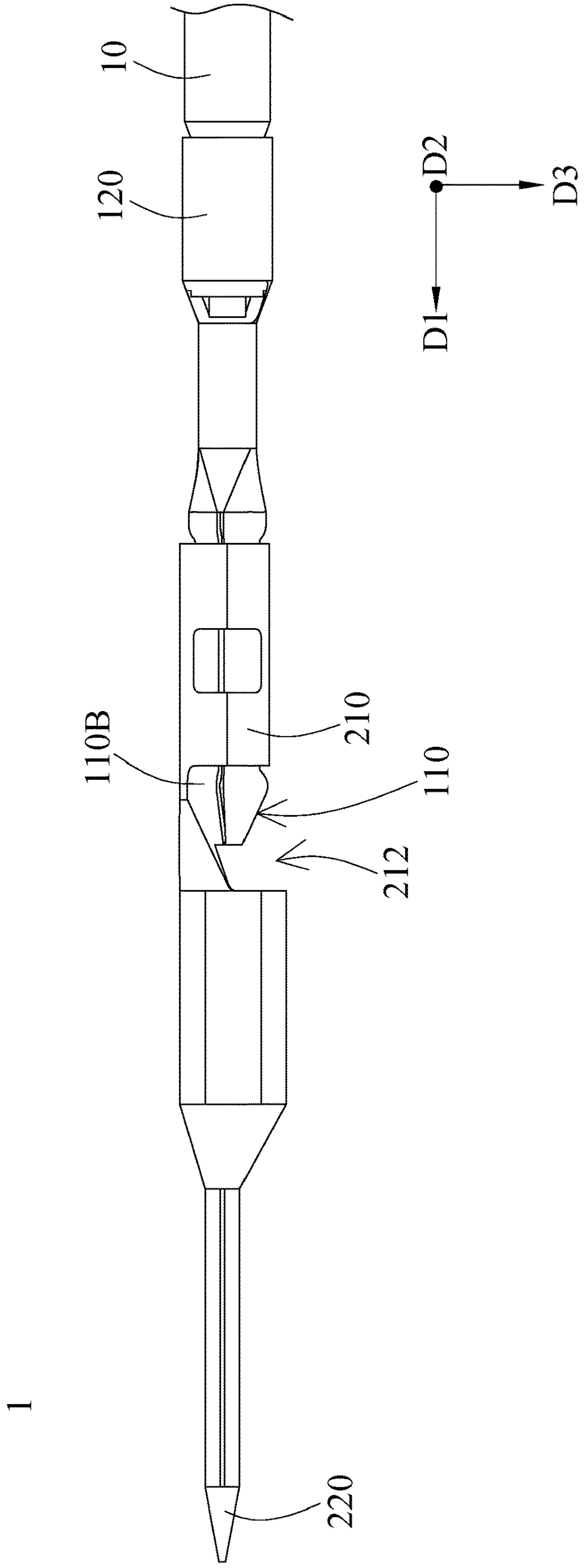
FIG. 13 is a side view of a plug end inserted into the slot structure of the conductive wire set according to the second embodiment of the present disclosure.

Further refer to FIG. 12 and FIG. 13, a three-dimensional schematic diagram illustrating the transfer terminal 100 of the conductive wire set 1 according to the second embodiment of the present disclosure and a side view thereof inserted into the slot structure 210, respectively. As illustrated in FIG. 12, each transfer terminal 100 in the present embodiment has an engaging portion 110B, which surrounds the transfer terminal 100 at a portion approaching the plug end 110, and the plug end 110 has a conical-shaped structure toward the first direction D1. As illustrated in FIG. 13, the positioning portion 212 in the present embodiment is located on the same side as the tubular/semi-tubular shaped structures 214 and located between the slot structure 210 and the pin end 220. For example, the positioning portion 212 may be a cavity to position a portion of each transfer terminal 100 approaching the plug end 110 therein.

The engaging portion 110B of the present embodiment surrounds a portion of the transfer terminal 100 approaching the plug end 110 and at least partially toward the third direction D3, which is different from both the first direction D1 and the second direction D2. Each transfer terminal 100 can be in the positioning portion 212, firmly in the positioning portion 212; therefore, it is not easily removed to fall off when receiving external forces.

In the present embodiment, per the following exact needs, three or more tubular/semi-tubular shaped structures 214 can also be provided on one side of the slot structure 210 to modify the slot structure 210 to insert three or more plug ends 110 therein.

In summary, the conductive wire set 1 provided according to the present disclosure can enable an automated installation mechanism by connecting the transfer terminal 100 to the outlet end 10A of the leads 10 correspondingly, and at least one slot 211 provided corresponding to each transfer terminal 100 in the slot structure 210 of the conductive terminal 200. In addition, the transfer terminal 100 connected to the leads 10 can be further prevented from accidentally falling off slot 211 via the engaging portion 110B in the transfer terminal 100 and the positioning portion 212.

The preceding represents some preferred embodiments of the present disclosure. It should be noted that various changes and modifications can be made to the disclosed embodiments without departing from the scope or spirit of the disclosure. It will be apparent to a person having ordinary skill in the art that the present disclosure is defined by the appended claims and in compliance with the intention of the present disclosure, various changes such as replacement, combination, modification, and adaptation for other purposes and the like do not exceed the scope defined by the appended claims of the present disclosure.

What is claimed is:

1. A conductive wire set comprising:

a plurality of leads arranged with each other and extending along a first direction, wherein each of the plurality of leads has an outlet end;

a plurality of transfer terminals, each corresponding to one of the plurality of leads, each of the plurality of transfer terminals has a lead connection end and a plug end opposite to each other, the lead connection end is connected to the outlet end of the corresponding lead;

a conductive terminal comprising:

a slot structure having at least one slot for inserting the plug ends, and a pin end opposite to the slot structure, wherein the plug ends are inserted into the at least one slot alongside and aligned with each other along a second direction other than the first direction, and wherein the at least one slot has therein at least one isolation structure at least partially extending along a third direction other than the first and second directions, so that the plug ends of adjacent two of the plurality of transfer terminals are respectively positioned on opposite two sides of the at least one isolation structure.

2. The conductive wire set of claim 1, wherein each plug end has an engaging portion engaged with at least one positioning portion in the slot structure.

3. The conductive wire set of claim 1, wherein each of the plurality of transfer terminals has a plug plane, and wherein the plug planes of adjacent two of the plurality of leads are configured to face each other when the plug ends are inserted into the at least one slot.

4. The conductive wire set of claim 2, wherein the engaging portion protrudes toward the third direction.

5. The conductive wire set of claim 2, wherein the engaging portion has a first inclined plane and a second inclined plane, respectively, located at a proximal end and a distal end opposite to each other along the first direction, and wherein the inclination degree of the first inclined plane is larger than that of the second inclined plane when an end surface of the plug end is a reference surface.

6. The conductive wire set of claim 1, wherein the slot structure has a first side wall and a second side wall opposite to each other along the second direction, wherein the at least one isolation structure includes one or more first isolation structures extending from the first side wall and into the at least one slot along the third direction after folding and one or more second isolation structures extending from the second side wall and into the at least one slot along the third direction after folding.

7. The conductive wire set of claim 1, wherein the at least one positioning portion includes at least one first positioning portion and at least one second positioning portion, respectively, located on opposite sides of the slot structure along the third direction, wherein the at least one first positioning portion is located on one side of the at least one isolation structure along the second direction, and wherein the at least one second positioning portion is located on the other side of the at least one isolation structure along the second direction.

8. The conductive wire set of claim 1, wherein the at least one slot has a plurality of tubular/semi-tubular shaped structures arranged along the second direction.

9. The conductive wire set of claim 8, wherein a positioning portion is located on the same side of the plurality of tubular/semi-tubular shaped structures and between the slot structure and the pin end, and each of the plurality of transfer terminals has an engaging portion at a portion circumferentially approaching the plug end, and wherein the plug end has a conical shaped structure toward the first direction.

10. A conductive wire set comprising:

a plurality of leads arranged with each other and extending along a first direction, wherein each of the plurality of leads has an outlet end;

a plurality of transfer terminals, each corresponding to one of the plurality of leads, each of the plurality of transfer terminals has a lead connection end and a plug end opposite to each other, the lead connection end is connected to the outlet end of the corresponding lead, the plug ends are aligned with each other along a second direction other than the first direction;

a conductive terminal comprising:

a slot structure having at least one slot for inserting the plug ends, and a pin end opposite to the slot structure, wherein each of the plug ends has an engaging portion engaged with at least one positioning portion in the slot structure, and wherein the at least one slot has therein at least one isolation structure at least partially extending along a third direction other than the first and second directions, so that the plug ends of adjacent two of the plurality of transfer terminals are respectively positioned on opposite two sides of the at least one isolation structure.

11. The conductive wire set of claim 10, wherein the plug ends are inserted into the at least one slot alongside each other along the second direction.

12. The conductive wire set of claim 10, wherein each of the plurality of transfer terminals has a plug plane, and wherein the plug planes of adjacent two of the plurality of leads are configured to face each other when the plug ends are inserted into the at least one slot.

13. The conductive wire set of claim 10, wherein the engaging portion protrudes toward the third direction.

14. The conductive wire set of claim 10, wherein the engaging portion has a first inclined plane and a second inclined plane, respectively, located at a proximal end and a distal end opposite to each other along the first direction, and wherein the inclination degree of the first inclined plane is larger than that of the second inclined plane when an end surface of the plug end is a reference surface.

15. The conductive wire set of claim 10, wherein the slot structure has a first side wall and a second side wall opposite to each other along the second direction, wherein the at least one isolation structure includes one or more first isolation structures extending from the first side wall and into the at least one slot along the third direction after folding and one or more second isolation structures extending from the second side wall and into the at least one slot along the third direction after folding.

16. The conductive wire set of claim 10, wherein the at least one positioning portion includes at least one first positioning portion and at least one second positioning portion, respectively, located on opposite sides of the slot structure along the third direction, wherein the at least one first positioning portion is located on one side of the at least one isolation structure along the second direction, and wherein the at least one second positioning portion is located on the other side of the at least one isolation structure along the second direction.

17. The conductive wire set of claim 10, wherein the at least one slot has a plurality of tubular/semi-tubular shaped structures arranged along the second direction.

18. The conductive wire set of claim 17, wherein the at least one positioning portion is located on the same side of the plurality of tubular/semi-tubular shaped structures and between the slot structure and the pin end, and the engaging portion is located at a portion circumferentially approaching the plug end, and wherein the plug end has a conical shaped structure toward the first direction.

* * * * *